(12) United States Patent
Ikeno et al.

(10) Patent No.: US 7,641,980 B2
(45) Date of Patent: Jan. 5, 2010

(54) LIQUID SILICONE RUBBER COATING COMPOSITION, CURTAIN AIRBAG AND MAKING METHOD

(75) Inventors: Masayuki Ikeno, Annaka (JP); Tsutomu Nakamura, Annaka (JP); Hidenori Mizushima, Annaka (JP); Shigeru Ubukata, Annaka (JP); Daichi Todoroki, Annaka (JP); Takashi Tanaka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/133,998

(22) Filed: Jun. 5, 2008

(65) Prior Publication Data

US 2009/0001690 A1    Jan. 1, 2009

(30) Foreign Application Priority Data

Jun. 28, 2007    (JP) ............................. 2007-169976

(51) Int. Cl.
    *B32B 9/06* (2006.01)
(52) U.S. Cl. ........................ 428/447; 524/492; 524/861

(58) Field of Classification Search ................. 428/450, 428/447, 451, 475.5; 524/861, 862, 789, 524/32, 588; 528/15, 16, 17; 280/728.1, 280/730.2; 442/76

See application file for complete search history.

(56) References Cited

U.S. PATENT DOCUMENTS

| 5,595,826 | A  | 1/1997  | Gray et al. |
| 7,059,627 | B2 | 6/2006  | Ikeno et al. |
| 7,307,122 | B2 | 12/2007 | Ikeno et al. |
| 2005/0267257 | A1 | 12/2005 | Mizushima et al. |
| 2006/0286390 | A1 | 12/2006 | Yaginuma et al. |

FOREIGN PATENT DOCUMENTS

| JP | 2003-327910 A | 11/2003 |
| JP | 2005-336270 A | 12/2005 |
| JP | 2006-348410 A | 12/2006 |

*Primary Examiner*—Arti Singh-Pandey
(74) *Attorney, Agent, or Firm*—Birch, Stewart, Kolasch & Birch, LLP

(57) ABSTRACT

A liquid silicone rubber coating composition comprising (A) an organopolysiloxane containing silicon-bonded alkenyl radicals, (B) an organohydrogenpolysiloxane containing SiH radicals, (C) an addition reaction catalyst, (D) finely divided silica, (E) an organosilicon compound containing epoxy and alkoxy radicals, (F) an organic titanium, zirconium or aluminum compound, and (G) a silanol-containing silane or siloxane compound is coated on a surface of an airbag base fabric and cured to form a rubber coating layer thereon. The composition is suited for curtain airbags.

10 Claims, No Drawings

LIQUID SILICONE RUBBER COATING COMPOSITION, CURTAIN AIRBAG AND MAKING METHOD

CROSS-REFERENCE TO RELATED APPLICATION

This non-provisional application claims priority under 35 U.S.C. §119(a) on Patent Application Ser. No. 2007-169976 filed in Japan on Jun. 28, 2007, the entire contents of which are hereby incorporated by reference.

TECHNICAL FIELD

This invention relates to a liquid silicone rubber coating composition suitable for curtain airbags, a curtain airbag having a rubber coating layer of the cured composition, and a method for preparing the curtain airbag.

BACKGROUND ART

Airbags for vehicles are generally manufactured by coating textile fabric such as nylon 66, nylon 6 or polyester with a silicone rubber coating layer and include ordinary airbags which are installed at the front seats and curtain airbags which are installed from the front pillar to the roof side. The curtain airbags have to stay inflated longer for protecting the head and preventing the passengers from being ejected upon collision or rollover.

For airbags, a number of silicone rubber compositions for forming a rubber coating on textile surface are known.

For example, JP-A 2003-327910 corresponding to U.S. Pat. No. 7,059,627 and U.S. Pat. No. 7,307,122, JP-A 2005-336270 corresponding to US 2005-0267257, and JP-A 2006-348410 corresponding to US 2006-0286390 disclose the use of organic titanium and zirconium compounds which help silicone rubber coatings to bond to textile fabric of nylon 66, nylon 6 or polyester. These compounds, however, can also serve as a catalyst for dehydrogenation reaction between organohydrogenpolysiloxane and silanol radicals on finely divided silica used for improving the mechanical strength of coating and as a catalyst for condensation reaction with hydrolyzable radicals on an adhesion promoter. As a result, the compositions increase their viscosity with the lapse of time and become difficult to form uniform coatings.

DISCLOSURE OF THE INVENTION

An object of the invention is to provide a liquid silicone rubber coating composition which undergoes a minimized change of viscosity with time and is excellent in uniform coating and thin coating, a curtain airbag having a silicone rubber coating layer formed by curing the composition to at least one surface of a substrate, and a method for preparing the curtain airbag.

The inventor has found that a liquid silicone rubber coating composition comprising (A) an organopolysiloxane containing at least two silicon-bonded alkenyl radicals per molecule, (B) an organohydrogenpolysiloxane containing at least two silicon-bonded hydrogen atoms per molecule, (C) an addition reaction catalyst, (D) finely divided silica, (E) an organosilicon compound containing an epoxy radical and a silicon-bonded alkoxy radical per molecule, (F) an organic titanium, zirconium or aluminum compound, and (G) a silane or siloxane compound containing one silanol radical per molecule is useful to form a rubber coating layer on an airbag base fabric, specifically a curtain airbag base fabric. The resulting rubber coating layer is fully uniform and thin, allowing the curtain airbag to prevent leakage of inflator gas and to sustain inflation for a certain time.

Accordingly, the present invention provides a liquid silicone rubber coating composition, a curtain airbag, and a method for preparing a curtain airbag, as defined below.

In one aspect, the invention provides a liquid silicone rubber coating composition for curtain airbags, comprising (A) 100 parts by weight of an organopolysiloxane containing at least two silicon-bonded alkenyl radicals per molecule, (B) an organohydrogenpolysiloxane containing at least two silicon-bonded hydrogen atoms per molecule, in a sufficient amount to provide 1 to 10 silicon-bonded hydrogen atoms per silicon-bonded alkenyl radical in component (A), (C) a catalytic amount of an addition reaction catalyst, (D) 1 to 50 parts by weight of finely divided silica having a specific surface area of at least 50 $m^2/g$, (E) 0.1 to 10 parts by weight of an organosilicon compound containing an epoxy radical and a silicon-bonded alkoxy radical per molecule, (F) 0.01 to 5 parts by weight of an organometallic compound selected from organotitanium, organozirconium and organoaluminum compounds, and (G) 0.1 to 20 parts by weight of a silane or siloxane compound having one silanol radical per molecule.

In another aspect, the invention provides a method for preparing a curtain airbag, comprising the steps of coating at least one surface of a substrate of textile fabric with the liquid silicone rubber coating composition defined herein, and curing the composition to form a silicone rubber coating layer on at least one surface of the substrate.

In a further aspect, the invention provides a curtain airbag comprising a substrate of textile fabric and a silicone rubber coating layer formed on at least one surface of the substrate by curing thereto the liquid silicone rubber coating composition defined herein.

BENEFITS OF THE INVENTION

The liquid silicone rubber coating composition of the invention undergoes a minimized change of viscosity with time and is excellent in uniform coating and thin coating. A curtain airbag having a silicone rubber coating layer formed by curing the composition to at least one surface of a substrate is effective for preventing leakage of inflator gas and for sustaining inflation for a certain time.

DESCRIPTION OF THE PREFERRED EMBODIMENTS

Component (A), which is a base polymer of the composition, is an organopolysiloxane which has at least two alkenyl radicals bonded to silicon atoms per molecule and is substantially free of silicon-bonded hydroxyl radicals (i.e., silanol radicals) within the molecule.

As used herein, the description "substantially free of silicon-bonded hydroxyl radicals within the molecule" means that an amount of hydroxyl radicals is not intentionally introduced into the polymer skeleton (i.e., siloxane skeleton) at the stage of molecule design. As is often the case, organopolysiloxane products contain incidental hydroxyl radicals at a level of about 200 ppm or less, most typically about 50 ppm or less, and the presence of hydroxyl radicals at such a level is acceptable.

Preferred are organopolysiloxanes having the average compositional formula (1):

$$R_a SiO_{(4-a)/2} \tag{1}$$

wherein R is each independently a substituted or unsubstituted monovalent hydrocarbon radical of 1 to 10 carbon atoms, preferably 1 to 8 carbon atoms, and "a" is a positive number in the range of 1.5 to 2.8, preferably 1.8 to 2.5, and more preferably 1.95 to 2.05.

Exemplary of the silicon-bonded alkenyl radicals, represented by R in formula (1), are those of about 2 to 8 carbons, and preferably about 2 to 4 carbons, such as vinyl, allyl, butenyl, pentenyl, hexenyl and heptenyl. Vinyl is most preferred.

In component (A), the positions of silicon atoms to which alkenyl radicals are bonded in the polysiloxane skeleton include the ends and/or intermediates (non-end positions) of the molecular chain. The preferred component (A) is a linear diorganopolysiloxane containing at least alkenyl radicals bonded to the silicon atoms at both ends of the molecular chain.

The content of alkenyl radicals in component (A) is preferably about 0.001 to 10 mol %, and more preferably about 0.01 to 5 mol %, based on all the monovalent organic radicals bonded to silicon atoms (i.e., substituted or unsubstituted monovalent hydrocarbon radicals represented by R in average compositional formula (1)).

Organic radicals other than alkenyl radicals which are bonded to silicon atoms on component (A), also represented by R in formula (1), include unsubstituted or halogen-substituted monovalent hydrocarbon radicals having generally about 1 to 12 carbons, and preferably about 1 to 10 carbons. Specific examples include alkyl radicals such as methyl, ethyl, propyl, butyl, pentyl, hexyl, cyclohexyl and heptyl, aryl radicals such as phenyl, tolyl, xylyl and naphthyl; aralkyl radicals such as benzyl and phenethyl; and haloalkyl radicals such as chloromethyl, 3-chloropropyl and 3,3,3-trifluoropropyl. Methyl and phenyl are most preferred.

Component (A) has a molecular structure which may be, for example, linear, cyclic, or branched. A linear diorganopolysiloxane in which the main chain is basically composed of repeating diorganosiloxane units and both ends of the molecular chain are capped with triorganosiloxy radicals is preferred. Here, "organo" radicals may include alkenyl radicals as well.

Component (A) preferably has a viscosity at 25° C. in the range of 100 to 500,000 mPa·s, and more preferably 300 to 100,000 mPa·s, for the reason that the resulting silicone rubber has good physical properties and the resulting composition is easy to handle and work with. Herein and throughout the specification, the viscosity is measured at 25° C. by a rotational viscometer or the like.

Illustrative examples of suitable organopolysiloxanes that may be used as component (A) include trimethylsiloxy-endcapped dimethylsiloxane-methylvinylsiloxane copolymers, trimethylsiloxy-endcapped methylvinylpolysiloxanes, trimethylsiloxy-endcapped dimethylsiloxane-methylvinylsiloxane-methylphenylsiloxane copolymers, dimethylvinylsiloxy-endcapped dimethylpolysiloxanes, dimethylvinylsiloxy-endcapped methylvinylpolysiloxanes, dimethylvinylsiloxy-endcapped dimethylsiloxane-methylvinylsiloxane copolymers, dimethylvinylsiloxy-endcapped dimethylsiloxane-methylvinylsiloxane-methylphenylsiloxane copolymers, divinylmethylsiloxy-endcapped dimethylpolysiloxanes, divinylmethylsiloxy-endcapped dimethylsiloxane-methylvinylsiloxane copolymers, trivinylsiloxy-endcapped dimethylpolysiloxanes, trivinylsiloxy-endcapped dimethylsiloxane-methylvinylsiloxane copolymers, organosiloxane copolymers composed of siloxane units of the formula $R^1_3SiO_{0.5}$, siloxane units of the formula $R^1_2R^2SiO_{0.5}$, siloxane units of the formula $R^1_2SiO$, and siloxane units of the formula $SiO_2$, organosiloxane copolymers composed of siloxane units of the formula $R^1_3SiO_{0.5}$, siloxane units of the formula $R^1_2R^2SiO_{0.5}$, and siloxane units of the formula $SiO_2$, organosiloxane copolymers composed of siloxane units of the formula $R^1_2R^2SiO_{0.5}$, siloxane units of the formula $R^1_2SiO$, and siloxane units of the formula $SiO_2$, organosiloxane copolymers composed of siloxane units of the formula $R^1R^2SiO$ and siloxane units of the formula $R^1SiO_{1.5}$ or siloxane units of the formula $R^2SiO_{1.5}$, and mixtures of two or more of these organopolysiloxanes. As used herein and throughout the specification, the term "endcapped" means that a siloxane is capped at both ends of the molecular chain with the referenced radicals, unless otherwise stated.

In the above formulas, $R^1$ is a substituted or unsubstituted monovalent hydrocarbon radical other than alkenyl. Specific examples include alkyls such as methyl, ethyl, propyl, butyl, pentyl, hexyl, cyclohexyl and heptyl; aryls such as phenyl, tolyl, xylyl and naphthyl; aralkyls such as benzyl and phenethyl; and haloalkyls such as chloromethyl, 3-chloropropyl and 3,3,3-trifluoropropyl. $R^2$ is an alkenyl radical, examples of which include vinyl, allyl, butenyl, pentenyl, hexenyl and heptenyl.

Component (B) is an organohydrogenpolysiloxane which reacts with component (A) and serves as a crosslinking agent. Its molecular structure is not particularly limited. Any of various organohydrogenpolysiloxanes synthesized in the prior art and having, for example, a linear, cyclic, branched or three-dimensional network (resinous) structure may be used. The organohydrogenpolysiloxane should have on the molecule at least two, and preferably at least three, silicon-bonded hydrogen atoms (hydrosilyl radicals represented by the formula SiH). Specifically it has about 2 to 300, preferably about 3 to 200, and more preferably about 3 to 100, SiH radicals. It is also substantially free of silicon-bonded hydroxyl radicals (i.e., silanol radicals) within the molecule.

Organohydrogenpolysiloxanes having the following average compositional formula (2) may be used as component (B).

$$R^3_b H_c SiO_{(4-b-c)/2} \tag{2}$$

In formula (2), $R^3$ is a substituted or unsubstituted monovalent hydrocarbon radical bonded to a silicon atom, which preferably has 1 to 10 carbon atoms and which is free of aliphatic unsaturation. Illustrative examples of the substituted or unsubstituted monovalent hydrocarbon radicals represented by $R^3$ include alkyl radicals such as methyl, ethyl, propyl, isopropyl, butyl, isobutyl, tert-butyl, pentyl, neopentyl, hexyl, cyclohexyl, octyl, nonyl and decyl; aryl radicals such as phenyl, tolyl, xylyl and naphthyl; aralkyl radicals such as benzyl, phenylethyl and phenylpropyl; and substituted forms of the foregoing radicals in which some or all hydrogen atoms are substituted by halogen atoms such as fluorine, bromine or chlorine, specific examples of which include chloromethyl, chloropropyl, bromoethyl and trifluoropropyl. The substituted or unsubstituted monovalent hydrocarbon radical represented by $R^3$ is preferably an alkyl or aryl, and more preferably methyl or phenyl. The letter b is a positive number from 0.7 to 2.1, c is a positive number from 0.001 to 1.0, and the sum b+c is a positive number from 0.8 to 3.0. Preferably, b is from 1.0 to 2.0, c is from 0.01 to 1.0, and b+c is from 1.5 to 2.5.

Two or more, and preferably three or more, SiH radicals on the molecule may be located at the ends of the molecular chain or at intermediate positions on the chain, or both. Although the organohydrogenpolysiloxane may have a linear, cyclic, branched or three-dimensional network structure, it is advantageous to use an organohydrogenpolysiloxane in which the number of silicon atoms per molecule (degree of polymerization) is generally about 2 to 300, preferably about 3 to 200, and more preferably about 4 to 150; which has a viscosity at 25° C. of generally about 0.1 to 1,000 mpa-s, preferably about 0.5 to 500 mPa-s; and which is liquid at room temperature (25° C.).

Illustrative examples of suitable organohydrogenpolysiloxanes that may be used as component (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, trimethylsiloxy-endcapped methylhydrogenpolysiloxanes, trimethylsiloxy-endcapped dimethylsiloxane-methylhydrogensiloxane copolymers, trimethylsiloxy-endcapped dimethylsiloxane-methylhydrogensiloxane-methylphenylsiloxane copolymers, trimethylsiloxy-endcapped dimethylsiloxane-methylhydrogensiloxane-diphenylsiloxane copolymers, dimethylhydrogensiloxy-endcapped methylhydrogenpolysiloxanes, dimethylhydrogensiloxy-endcapped dimethylpolysiloxanes, dimethylhydrogensiloxy-endcapped dimethylsiloxane-methylhydrogensiloxane copolymers, dimethylhydrogensiloxy-endcapped dimethylsiloxane-methylphenylsiloxane copolymers, dimethylhydrogensiloxy-endcapped dimethylsiloxane-diphenylsiloxane copolymers, dimethylhydrogensiloxy-endcapped methylphenylpolysiloxanes, dimethylhydrogensiloxy-endcapped diphenylpolysiloxanes, and substituted forms of the foregoing in which some or all methyl radicals are substituted by other alkyl radicals such as ethyl or propyl, as well as organosiloxane copolymers composed of siloxane units of the formula $R^3{}_3SiO_{0.5}$, siloxane units of the formula $R^3{}_2HSiO_{0.5}$, and siloxane units of the formula $SiO_2$, organosiloxane copolymers composed of siloxane units of the formula $R^3{}_2HSiO_{0.5}$, and siloxane units of the formula $SiO_2$, organosiloxane copolymers composed of siloxane units of the formula $R^3HSiO$ and siloxane units of the formula $R^3SiO_{1.5}$ or siloxane units of the formula $HSiO_{1.5}$, and mixtures of two or more of these organopolysiloxanes. $R^3$ in the above formulas represents monovalent hydrocarbon radicals other than alkenyl, and is exemplified by the same radicals as those mentioned above.

Component (B) is preferably compounded in such an amount as to provide 1 to 10 moles, and more preferably 1 to 5 moles, of silicon-bonded hydrogen atoms in component (B) per mole of silicon-bonded alkenyl radicals in component (A), that is, 1 to 10, and more preferably 1 to 5 silicon-bonded hydrogen atoms per alkenyl radical, although the amount is not limited thereto. If the amount of silicon-bonded hydrogen atoms in component (B) is less than 1 mole per mole of silicon-bonded alkenyl radicals in component (A), the composition may not cure to a full extent. On the other hand, the inclusion of more than 10 moles excessively diminishes the heat resistance of silicone rubber.

Component (C) is an addition reaction catalyst. Any of such catalysts may be used as long as they can promote the hydrosilylating addition reaction between silicon-bonded alkenyl radicals in component (A) and SiH radicals in component (B). Examples of suitable catalysts include platinum group metals and their compounds such as platinum, palladium, rhodium, chloroplatinic acid, alcohol-modified chloroplatinic acid, coordination compounds of chloroplatinic acid with olefins, vinylsiloxane or acetylene compounds, tetrakis(triphenylphosphine)palladium, chlorotris(triphenylphosphine)rhodium, and the like. Platinum compounds are most preferred.

The addition reaction catalyst is compounded in a catalytic amount, typically in an amount of 0.5 to 1,000 ppm, preferably in an amount of 1 to 500 ppm, and more preferably 10 to 100 ppm, expressed as the weight of catalyst metal element based on the combined weight of components (A) and (B). At less than 0.5 ppm, the addition reaction may become very slow or curing may not take place. On the other hand, too much amounts add to the cost, rendering the composition uneconomical.

Component (D) is finely divided silica which serves as a reinforcement, that is, to impart a high tear strength to the inventive composition. Use of finely divided silica as the reinforcement enables to form a coating layer which fulfills the tear strength properties required in the preferred embodiment of the invention. The finely divided silica should have a specific surface area of at least 50 $m^2/g$, preferably 50 to 400 $m^2/g$, and more preferably 100 to 300 $m^2/g$, as measured by the BET method. At a specific surface area of less than 50 $m^2/g$, satisfactory tear strength properties cannot be achieved.

In the practice of the invention, the finely divided silica may be any known silica used as a reinforcing filler for silicone rubber, provided the silica has a specific surface area within the above-indicated range. Exemplary silicas include fumed silica and precipitated silica. Any one or combinations of two or more thereof may be used. Such finely divided silica may be used directly without modification. However, it is advantageous to treat silica with organosilicon compounds prior to use in order to impart a good flow to the inventive composition. Exemplary organosilicon compounds include methylchlorosilanes such as trimethylchlorosilane, dimethyldichlorosilane, and methyltrichlorosilane, dimethylpolysiloxane, and hexaorganodisilazanes such as hexamethyldisilazane, divinyltetramethyldisilazane, and dimethyltetravinyldisilazane.

The amount of component (D) compounded is 1 to 50 parts by weight per 100 parts by weight of the organopolysiloxane (A). An appropriate amount of component (D) is 1 to 40 parts by weight, and more preferably 5 to 40 parts by weight. Too less amounts may fail to provide the desired tear strength whereas too much component (D) may compromise the flow of the composition, making the coating operation inefficient.

Component (E) is an organosilicon compound containing an epoxy radical and a silicon-bonded alkoxy radical per molecule. Although any of such organosilicon compounds may be used, organosilicon compounds such as silanes and cyclic or linear siloxanes of 2 to about 30 silicon atoms, preferably 4 to about 20 silicon atoms, having at least one epoxy radical and at least two silicon-bonded alkoxy radicals are preferred for the attainment of adhesion.

In a preferred embodiment, the epoxy radical is bonded to a silicon atom in the form of a glycidoxyalkyl radical such as glycidoxypropyl, or an epoxy-bearing cyclohexylalkyl radical such as 2,3-epoxycyclohexylethyl or 3,4-epoxycyclohexylethyl. The preferred silicon-bonded alkoxy radicals are trialkylsilyl and alkyldialkoxysilyl radicals such as trimethylsilyl, triethylsilyl, methyldimethoxysilyl, ethyldimethoxysilyl, methyldiethoxysilyl, and ethyldiethoxysilyl.

The organosilicon compound (E) may contain a functional radical other than the epoxy radical and silicon-bonded alkoxy radical, the functional radical being at least one type selected from among alkenyl radicals such as vinyl, (meth) acryloxy radicals, and hydrosilyl (SiH) radicals.

Examples of the organosilicon compound (E) include organosilicon compounds of the chemical formulas shown below, mixtures of two or more thereof, and partial hydrolytic condensates of one or more thereof.

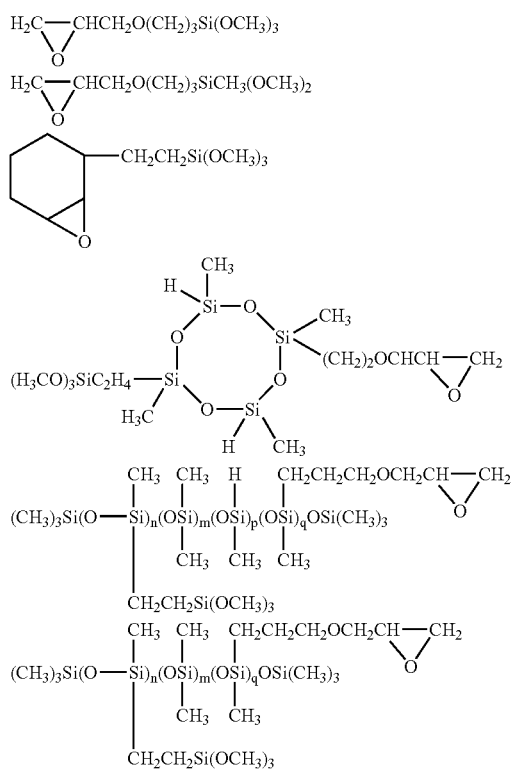

Herein, n is an integer of 1 to 10, m is an integer of 0 to 100, and preferably 0 to 20, p is an integer of 1 to 100, and preferably 1 to 20, and q is an integer of 1 to 10.

The amount of component (E) added is 0.1 to 10 parts by weight and preferably 0.1 to 5 parts by weight per 100 parts by weight of component (A). With less than 0.1 pbw of component (E), the resulting composition is not self-adhesive. More than 10 pbw of component (E) can detract from the cured physical properties.

Component (F) is an organometallic compound selected from among organotitanium, organozirconium and organoaluminum compounds, which serves as a condensation co-catalyst for enhancing adhesion. Exemplary of component (F) are:

titanium-based condensation co-catalysts including organic titanate esters such as tetraisopropyl titanate and tetrabutyl titanate, and organic titanium chelate compounds such as diisopropoxyCacetylacetonato)titanium, diisopropoxy(ethylacetoacetate)titanium, tetraacetylacetonatotitanium and titanium tetraacetylacetate;

zirconium-based condensation co-catalysts including organic zirconium esters such as zirconium tetrapropylate and zirconium tetrabutyrate, organic zirconium chelate compounds such as tributoxyacetylacetonatozirconium, butoxyacetylacetonatozirconium bisethylacetoacetate, and tetraacetylacetonatozirconium, and oxozirconium compounds such as zirconium bis(2-ethylhexanoate)oxide and acetylacetonatozirconium (2-ethylhexanoate)oxide; and aluminum-based condensation co-catalysts including aluminum alcoholates such as aluminum triethylate, aluminum triisopropylate and aluminum tri(sec-butylate), aluminum chelate compounds such as diisopropoxyaluminum(ethylacetoacetate), aluminum tris(ethylacetoacetate), tris(acetylacetonato)aluminum, and aluminum acyloxy compounds such as hydroxyaluminum bis(2-ethylhexanoate).

The amount of component (F) added is 0.01 to 5 parts by weight and preferably 0.1 to 2 parts by weight per 100 parts by weight of component (A). With less than 0.01 pbw of component (F), adhesion and air-tightness decline. More than 5 pbw of component (F) can detract from the heat resistance of the cured composition.

Component (G) is a silane or siloxane compound having one silanol radical (i.e., silicon-bonded hydroxyl radical) per molecule. Such silane or siloxane compounds may be used alone or in admixture. Preferred siloxane compounds are oligomers having about 2 to 20 silicon atoms, more preferably about 2 to 10 silicon atoms, and even more preferably about 2 to 4 silicon atoms per molecule. Their molecular structure may be linear, cyclic or branched.

In addition to the hydroxyl radical, the silane or siloxane compound as component (G) may contain an organic radical bonded to a silicon atom. Such organic radicals are as exemplified for R in average compositional formula (1) for component (A), for example, unsubstituted or halo-substituted monovalent hydrocarbon radicals of 1 to about 12 carbon atoms, and preferably 1 to about 10 carbon atoms, and epoxy-functional group-substituted alkyl radicals such as γ-glycidoxypropyl and β-(3,4-epoxycyclohexyl)ethyl. Of these, methyl, ethyl, propyl, phenyl, vinyl and γ-glycidoxypropyl are preferred.

Component (G) serves to inhibit the composition from increasing its viscosity with the lapse of time. Exemplary of component (G) having such function are organosilicon compounds of the formulae shown below. In the formulae, Ph is phenyl and r is an integer of 1 to 20.

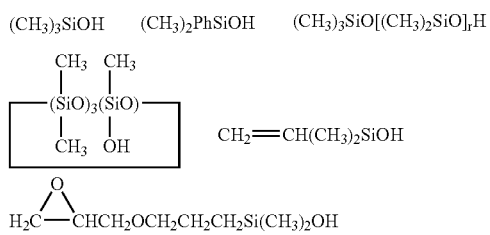

The amount of component (G) added largely depends on its own molecular weight and is 0.1 to 20 parts and preferably 0.1 to 10 parts by weight per 100 parts by weight of component (A). Less than 0.1 pbw of component (G) is ineffective for inhibiting a viscosity buildup whereas more than 20 pbw may detract from the cured physical properties.

In addition to the foregoing components (A) to (G), the coating composition of the invention may further include optional components. Typically, any of regulator compounds which are known to have a cure inhibiting effect on the addition reaction catalyst may be used as an additional component. Examples of such regulator include phosphorus-containing compounds such as triphenylphosphine, nitrogen-containing compounds such as tributylamine, tetramethylethylenediamine and benzotriazole, sulfur-containing compounds, acetylene compounds, compounds having two or more alkenyl radicals, hydroperoxy compounds and maleic acid derivatives. The extent of the cure-retarding effect achieved by the regulator varies considerably according to the chemical structure of the regulator. It is thus preferable to adjust the amount of regulator included in the composition so as to be optimal for a particular regulator compound used. Generally, the addition of too little regulator may fail to provide long-term shelf stability at room temperature, whereas the addition of too much may impede curing.

Other optional components include inorganic fillers such as crystalline silica, hollow fillers, silsesquioxane, fumed titanium dioxide, magnesium oxide, zinc oxide, iron oxide, aluminum hydroxide, magnesium carbonate, calcium carbonate, zinc carbonate, sheet mica, carbon black, diatomaceous earth, and glass fibers; and these fillers that have been surface-treated with organosilicon compounds such as organoalkoxysilane compounds, organochlorosilane compounds, organosilazane compounds or low-molecular-weight siloxane compounds. Silicone rubber powders and silicone resin powders are also included.

Insofar as the objects of the invention may be attained, the coating composition of the invention may further include as optional components organopolysiloxanes having on the molecule one silicon-bonded hydrogen atom or alkenyl radical and bearing no other functional radicals, non-functional organopolysiloxanes having no silicon-bonded hydrogen atoms or alkenyl radicals, organic solvents, creep hardening inhibitors, plasticizers, thixotropic agents, pigments, dyes and mildew-proofing agents.

The liquid silicone rubber coating composition of the invention may be prepared by mixing together the components by a standard technique. The viscosity of the overall composition is not particularly limited. Usually, the composition may have a viscosity at 25° C. of 5 to 500 Pa-s, preferably 10 to 400 Pa-s, and more preferably 20 to 200 Pa-s.

The liquid silicone rubber coating composition thus prepared undergoes little change of viscosity with time and is improved in uniform coating and thin film coating. Then it is particularly useful as coatings for curtain airbags which are installed from the front pillar to the roof side of automobiles and which have to stay inflated longer for protecting the head and preventing the passengers from being ejected upon collision or rollover.

Airbags, especially curtain airbags, on which a silicone rubber coating layer is formed from the inventive composition, may be of well-known construction. The base fabric used therein is a woven fabric made of synthetic fiber, such as nylon 66, nylon 6, polyester fiber, aramid fiber, various types of polyamide fiber and various types of polyester fiber. The airbags include plain-weave airbags which are made by joining a pair of plain-woven base fabric sheets (lined with rubber on the inside surface) along the periphery edge together with an adhesive, and stitching-the edges together through the adhesive layer; and hollow-weave airbags which are made as a bag by hollow weaving.

The silicone rubber-coated base fabric for curtain airbags may be prepared by coating the liquid silicone rubber coating composition to at least one surface, typically one surface of a substrate of textile fabric, and placing the coated substrate in a hot air drying oven for heat curing the composition to form a silicone rubber coating layer on the substrate.

The substrate of textile fabric used herein include substrates comprising a base fabric selected from woven fabrics of the above-mentioned various types of synthetic fiber. A conventional method may be used to coat the inventive composition onto a substrate surface. The coating weight of the composition (or thickness of coating layer) is generally about 10 to 150 g/m², preferably about 15 to 80 g/m²₁ and most preferably about 20 to 60 g/m².

Curing methods and conditions known to the art may be used for curing the coating compositions. Generally, the composition can be cured at a temperature of 120 to 180° C. for a period of 1 to 10 minutes.

EXAMPLE

Examples and Comparative Examples are given below for illustrating the invention, but not intended to limit the scope thereof. In these examples, all parts are by weight. The viscosity was measured at 25° C. by a rotational viscometer.

Example 1

Into a kneader were admitted 60 parts of a vinyldimethylsilyl-endcapped dimethylpolysiloxane having a viscosity of about 30,000 mPa-s, 8 parts of hexamethyldisiloxane, 2 parts of water, and 40 parts of fumed silica having a specific surface area of about 300 m²/g by the BET method (Aerosil 300, Nippon Aerosil Co., Ltd.). The contents were mixed for one hour, after which the mixture was heated to a temperature of 150° C. and mixed for a further 2 hours.

Thereafter, the mixture was cooled to room temperature, to which were added 24 parts of vinyldimethylsilyl-endcapped dimethylpolysiloxane having a viscosity of about 30,000 mPa-s and 5 parts of a dimethylpolysiloxane containing 5 mol % of vinylmethylsilyl units and having a viscosity of about 700 mpa-s. The ingredients were mixed until uniform, obtaining Base Compound I.

A composition "A" was prepared by mixing together the following ingredients: 64 parts of Base Compound I, 8 parts of a vinyldimethylsilyl-endcapped dimethylpolysiloxane containing 0.18 mol % of vinylmethylsilyl units and having a viscosity of about 30,000 mPa-s, 23 parts of a vinyldimethylsilyl-endcapped dimethylpolysiloxane having a viscosity of about 30,000 mPa-s, 35 parts of a vinyldimethylsilyl-endcapped dimethylpolysiloxane having a viscosity of about 100,000 mPa-s, 3 parts of a dimethylsiloxane-methylhydrogensiloxane copolymer having a viscosity of 10 mPa-s and having silicon-bonded hydrogen atoms on side chains off the molecular chain (silicon-bonded hydrogen atom content, 0.82 wt %), 0.02 part of 1-ethynylcyclohexanol, 0.25 part of a dimethylpolysiloxane solution of chloroplatinic acid/1,3-divinyltetramethyl-disiloxane complex (platinum atom content, 1 wt %), 0.14 part of tetramethyltetravinylcyclotetrasiloxane, 0.7 part of γ-glycidoxypropyltrimethoxysilane, 0.7 part of γ-methacryloxypropyltrimethoxysilane, 0.1 part of tetraacetylacetonatozirconium, 0.15 part of hydroxyaluminum bis(2-ethylhexanoate), and 0.5 part of trimethylsilanol.

This composition "A" had an initial viscosity of 110 Pa-s and a viscosity of 118 Pa-s after 3 hours of aging. When the initial and aged compositions were coated at a coating weight of 60 g/m² by a coater, both could be uniformly coated without variations.

Example 2

A composition "B" was prepared as in Example 1 except that 1.7 parts of 1-hydroxyheptamethylcyclotetrasiloxane was used instead of the trimethylsilanol.

This composition "B" had an initial viscosity of 110 Pa-s and a viscosity of 120 Pa-s after 3 hours of aging. Both the initial and aged compositions could be uniformly coated at a coating weight of 60 g/m² by a coater, without variations.

Comparative Example 1

A composition "C" was prepared as in Example 1 except that the trimethylsilanol was omitted.

This composition "C" had an initial viscosity of 124 Pa-s and a viscosity of 224 Pa-s after 3 hours of aging. The initial composition could be uniformly coated at a coating weight of 60 g/m² by a coater, without variations. The aged composition could not form a uniform coating free of variations when it was coated by a coater at a coating weight of 60 g/m².

Japanese Patent Application No. 2007-169976 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A liquid silicone rubber coating composition for curtain airbags, comprising
   (A) 100 parts by weight of an organopolysiloxane containing at least two silicon-bonded alkenyl radicals per molecule,
   (B) an organohydrogenpolysiloxane containing at least two silicon-bonded hydrogen atoms per molecule, in a sufficient amount to provide 1 to 10 silicon-bonded hydrogen atoms per silicon-bonded alkenyl radical in component (A),
   (C) a catalytic amount of an addition reaction catalyst,
   (D) 1 to 50 parts by weight of finely divided silica having a specific surface area of at least 50 m²/g,
   (E) 0.1 to 10 parts by weight of an organosilicon compound containing an epoxy radical and a silicon-bonded alkoxy radical per molecule,
   (F) 0.01 to 5 parts by weight of an organometallic compound selected from organotitanium, organozirconium and organoaluminum compounds, and
   (G) 0.1 to 20 parts by weight of a silane or siloxane compound having one silanol radical per molecule.

2. A method for preparing a curtain airbag, comprising the steps of coating at least one surface of a substrate of textile fabric with the liquid silicone rubber coating composition of claim 1, and curing the composition to form a silicone rubber coating layer on at least one surface of the substrate.

3. A curtain airbag comprising a substrate of textile fabric and a silicone rubber coating layer formed on at least one surface of the substrate,
   wherein the silicone rubber coating layer is obtained by coating at least one surface of the substrate with a liquid silicone rubber coating composition and curing the composition, and
   wherein the liquid silicone rubber coating composition comprises
   (A) 100 parts by weight of an organopolysiloxane containing at least two silicon-bonded alkenyl radicals per molecule,
   (B) an organohydrogenpolysiloxane containing at least two silicon-bonded hydrogen atoms per molecule, in a sufficient amount to provide 1 to 10 silicon-bonded hydrogen atoms per silicon-bonded alkenyl radical in component (A),
   (C) a catalytic amount of an addition reaction catalyst,
   (D) 1 to 50 parts by weight of finely divided silica having a specific surface area of at least 50 m²/g,
   (E) 0.1 to 10 parts by weight of an organosilicon compound containing an epoxy radical and a silicon-bonded alkoxy radical per molecule,
   (F) 0.01 to 5 parts by weight of an organometallic compound selected from organotitanium, organozirconium and organoaluminum compounds, and
   (G) 0.1 to 20 parts by weight of a silane or siloxane compound having one silanol radical per molecule.

4. The composition of claim 1, wherein the organopolysiloxane of the component (A) has the following average compositional formula (1):

$$R_a SiO_{(4-a)/2} \quad (1)$$

wherein R is each independently a substituted or unsubstituted monovalent hydrocarbon radical of 1 to 10 carbon atoms, and "a" is a positive number in the range of 1.5 to 2.8, the content of alkenyl radicals in the component (A) is about 0.001 to 10 mol% based on all the monovalent hydrocarbon radicals represented by R, and the component (A) has a viscosity at 25° C. in the range of 100 to 500,000 mPa-s, the organohydrogenpolysiloxane of the component (B) has the following average compositional formula (2):

$$R^3_b H_c SiO_{(4-b-c)/2} \quad (2)$$

wherein $R^3$ is a substituted or unsubstituted monovalent hydrocarbon radical of 1 to 10 carbon atoms and free of aliphatic unsaturation, the letter b is a positive number from 0.7 to 2.1, c is a positive number from 0.001 to 1.0 and the sum of b+c is a positive number from 0.8 to 3.0, and the component (B) has a viscosity at 25° C. in the range of about 0.1 to 1,000 mPa-s, the addition reaction catalyst of the component (c) is a platinum group metal or its compound, and the composition has a viscosity at 25° C. of 5 to 500 Pa-s.

5. The composition of claim 1, wherein the organosilicon compound of the component (E) is at least one selected from the group consisting of compounds having the following formulae:

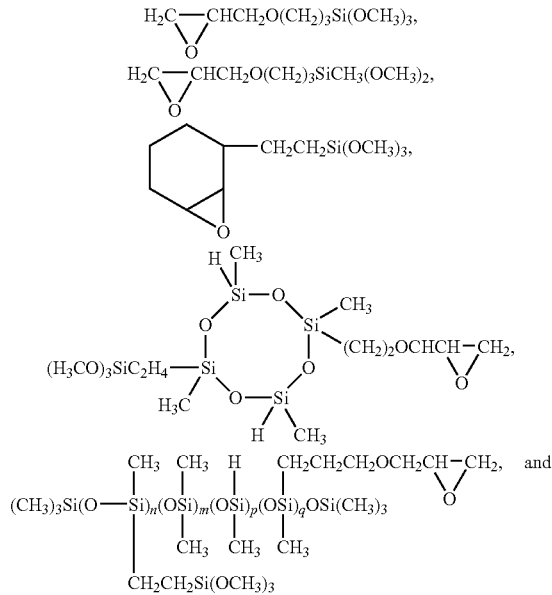

-continued

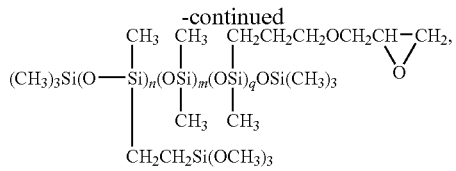

wherein n is an integer of 1 to 10, m is an integer of 0 to 100, p is an integer of 1 to 100, and q is an integer of 1 to 10.

6. The composition of claim 1, wherein the organometallic compound of the component (F) is at least one selected from the group consisting of organic titanate esters, organic titanium chelate compounds, organic zirconium esters, organic zirconium chelate compounds, oxozirconium compounds, aluminum alcoholates, aluminum chelate compounds, and aluminum acyloxy compounds.

7. The composition of claim 1, wherein the siloxane compound of the component (G) is an oligomer having about 2 to 20 silicon atoms.

8. The composition of claim 1, wherein the silane or siloxane compound having one silanol radical per molecule of the component (G) further contains an organic radical bonded to a silicon atom selected from the group consisting of unsubstituted or halo-substituted monovalent hydrocarbon radicals of 1 to about 12 carbon atoms, and epoxy-functional group-substituted alkyl radicals.

9. The composition of claim 1, wherein the component (G) is at least one selected from the group consisting of compounds having the following formulae:

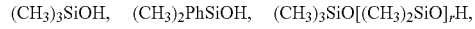
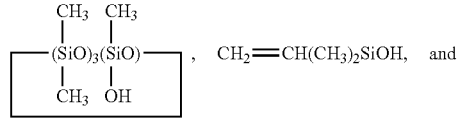

wherein Ph is phenyl and r is an integer of 1 to 20.

10. The composition of claim 1, wherein the component (G) is added in an amount of 0.1 to 10 parts per 100 parts by weight of the component (A).

* * * * *